United States Patent
Estes et al.

[15] 3,673,873
[45] July 4, 1972

[54] SENSING INSTRUMENT HAVING A CANTILEVERED PROOF MASS

[72] Inventors: Joseph F. Estes, Fullerton; Imre Kertesz, Placentia, both of Calif.

[73] Assignee: North American Rockwell Corporation

[22] Filed: Oct. 23, 1969

[21] Appl. No.: 868,678

[52] U.S. Cl. ............................................................73/517
[51] Int. Cl. ......................................................G01p 15/08
[58] Field of Search ...........................................73/514–517

[56] References Cited
UNITED STATES PATENTS

3,339,419  9/1967  Wilcox.................................73/517 B

*Primary Examiner*—James J. Gill
*Attorney*—L. Lee Humphries and H. Frederick Hamann

[57] ABSTRACT

Inertial sensing instrument, particularly accelerometers, that utilize a cantilevered proof mass having a flexure pivot for the inertial sensing element. Chemical etching is used to provide a smooth convex taper to the proof mass so as to establish the cantilever.

4 Claims, 3 Drawing Figures

INVENTORS
JOSEPH F. ESTES
IMRE KERTESZ
BY
ATTORNEY

SENSING INSTRUMENT HAVING A CANTILEVERED PROOF MASS

BACKGROUND OF THE INVENTION

The present invention relates to instruments that contain a cantilevered proof-mass using clamped flexure suspensions and method of manufacture thereof. Such instruments may include inertial instruments, transducers, or other instruments or devices using etchable glass, ceramic, or other materials as sensing elements in which mechanical hysteresis and/or instrument bias is introduced due to clamped or bonded joints or interfaces.

In the prior art, an electromagnetic accelerometer described in U.S. Pat. No. 3,339,419, entitled Accelerometer, issued to D. E. Wilcox on Sept. 5, 1967, an acceleration sensor subassembly is disclosed which utilizes a cantilevered proof mass having a flexure pivot for the sensing element. The cantilever is provided by means of shims appropriately positioned at the interface of the proof mass and adjacent stator elements. The proof mass itself is not tapered nor are the stator body faces. Although providing a substantial improvement over prior accelerometers, the shims, nevertheless, still precipitate undesirable instrument bias and mechanical hysteresis because of nonrestorative slippage at the clamped interface of the proof mass outer tim and the shims. In addition, the shims represent additional labor and material cost that can be eliminated with removal of the shims from the instrument. The present invention avoids the use of shims as an undesirable mechanical expedient, and further, as a result, the sensing instrument of the present invention exhibits considerable improvement in instrument bias and mechanical hysteresis.

SUMMARY OF THE INVENTION

The present invention relates to inertial sensing elements and method of manufacture and in particular an electromagnetic accelerometer whereby a taper is provided at the proof mass mating surface of the electromagnetic accelerometer. The taper is applied to the proof mass and is subject to precise control. The preferred embodiment discloses tapering the proof mass by means of a chemical etching process which etches at a predetermined rate calculated to result in a smooth taper of the desired convex shape. The use of the etching process provides a simplified, economical method of producing an electromagnetic accelerometer having fewer parts and evincing improved mechanical hysteresis and instrument operational properties. The etching technique is clean and all surfaces are available for inspection after the tapering is complete. The proof mass can thus be tapered prior to expensive processing and assembly operations.

In accelerometers employing a cantilevered proof mass, forces of any origin, except inertial, imposed on the cantilever support structure can result in proof mass deflection with attendant errors in the accelerometer output. The effect of these forces can be minimized; however, the forces and their sources may still exist.

It is therefore an object of this invention to provide an accelerometer which utilizes an improved tapered cantilevered proof mass support structure that minimizes acelerometer errors.

A further object is to provide a proof mass support which will minimize the magnitude of existing forces in the cantilevered proof mass.

Another object is to provide a cantilever support method which provides for decreasing certain error forces or the change in certain error forces on the proof mass.

Another object of the invention is to provide a method whereby the proof mass cantilever support can be fabricated to minimize the effects of noninertial forces.

Still another object is to provide a method whereby the errors, due to the mechanical hysteresis characteristics of the cantilevered proof mass, are minimized.

A further object is the provision of an accelerometer in which the assembly is simplified.

Another object of the invention is to provide an accelerometer utilizing a cantilevered proof mass which produces substantially improved alignment of the proof mass.

BRIEF DESCRIPTION OF THE DRAWINGS

FIG. 1 is an enlarged half section of details of the proof mass, shown in FIG. 1.

DESCRIPTION OF THE PREFERRED EMBODIMENT

The method of manufacture disclosed herein is used to construct an accelerometer that is a single axis closed loop force rebalance type which utilizes self-contained microminiaturized servo and digitizer electronics. The inertial sensor is inherently analog with respect to input acceleration. Digital velocity information is obtained by means of a digitizing force servo loop. Microminiature electronics (now shown) are used to provide the analog servo loop and to digitize the resulting analog rebalance current to reposition the proof mass. The servo loop, in response to the pickoff signal, controls the forcer coil current so that the coil electromotive force exactly balances the proof mass capacitance pair offset resulting from the inertial forces applied to the instrument. The electronics provided an output signal that is digital with respect to velocity and is discrete over the instrument acceleration range.

Figure 1:
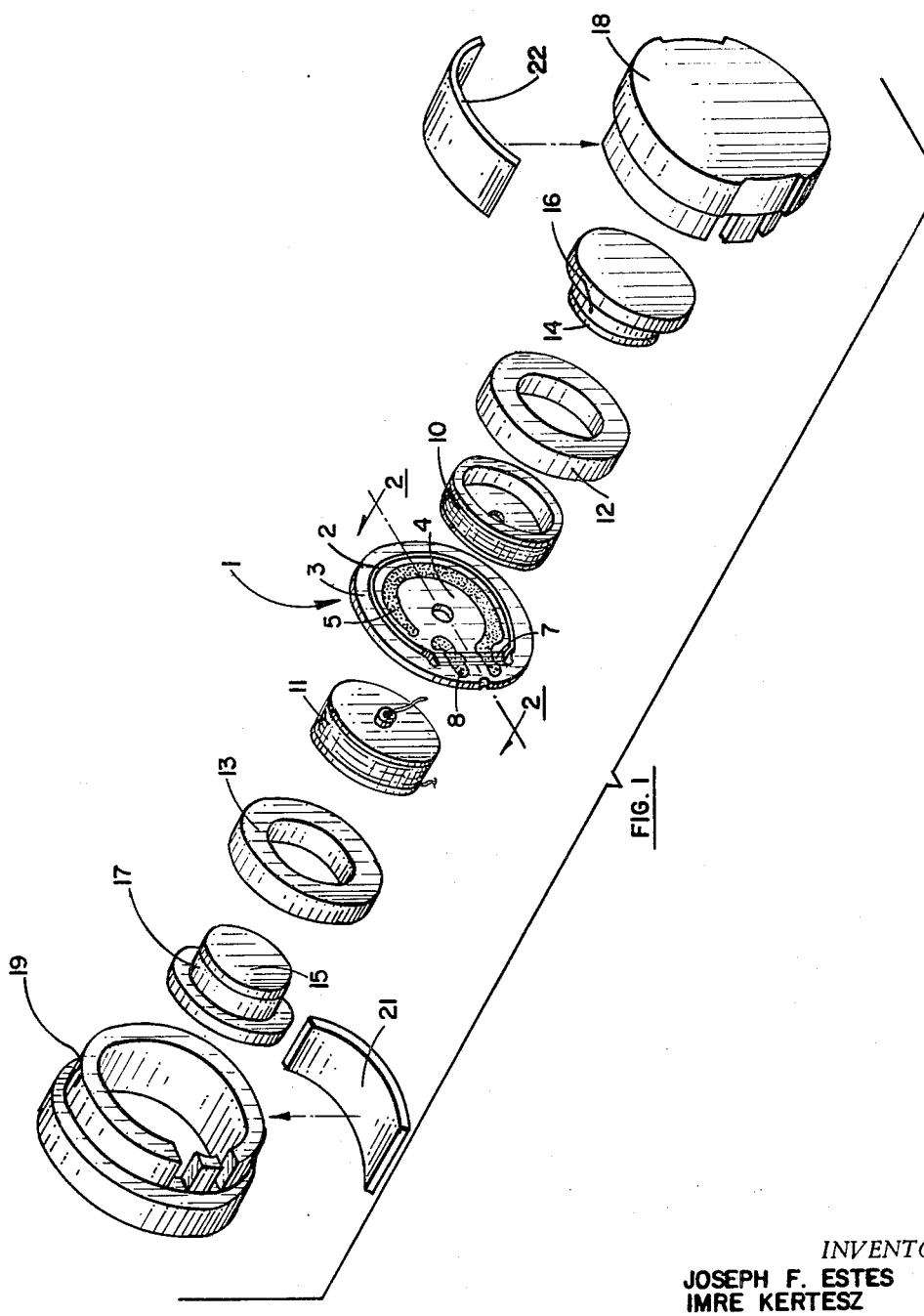
FIG. 1 shows an exploded view of the accelerometer acceleration sensor subassembly consisting of the top magnet stator element, the proof mass with pickoff capacitors and attached forcer coils, and the bottom magnet stator element.
Figure 2:
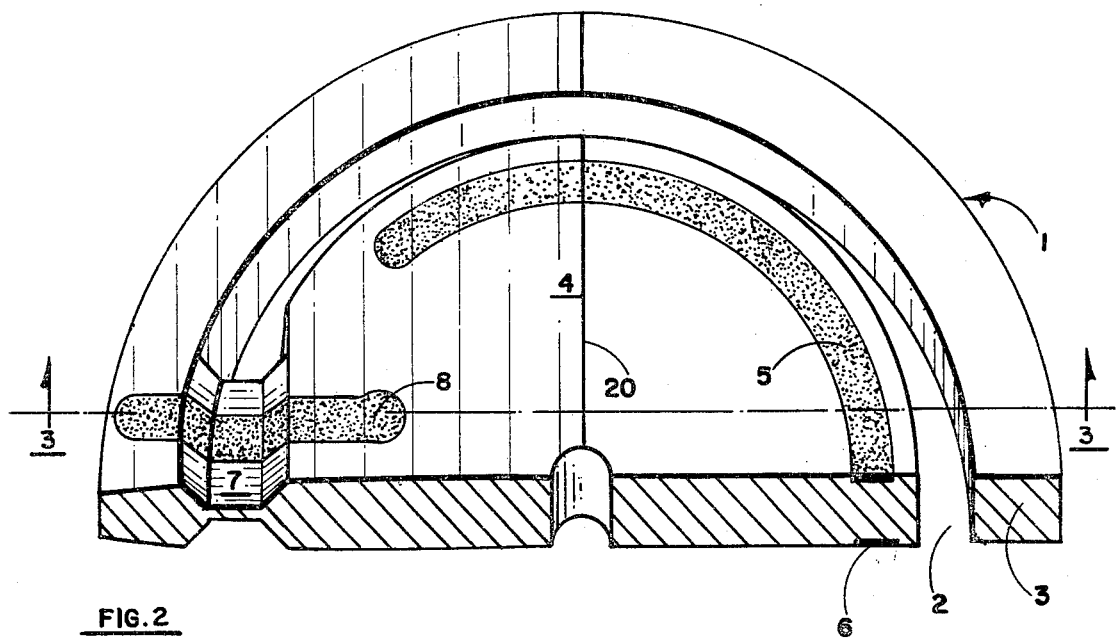
Figure 3:
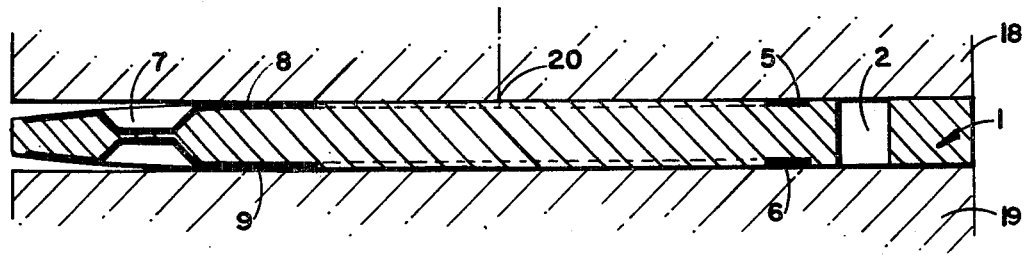
FIG. 3 is a cross section of the acceleration sensor subassembly showing the interface contacts of the proof mass.

Referring now to the drawings, the accelerometer acceleration sensor subassembly consists basically of a flexure-suspended pendulum, represented by the chemically etched and tapered proof mass 1 with pickoff capacitors 5 and 6, and attached force rebalance coils 10 and 11. The attached forcer coils provide a rebalance force through interaction of the coil current and the magnetic field of the magnet stator elements 16 and 17. In the preferred embodiment of the present invention, as shown in FIGS. 1 to 3, chemically tapered proof mass disk 1 is fabricated from a single disk of precisely lapped fused silica. A ring-shaped cutout 2 is employed to form a ring shaped base member 3 and a central disk 4 which is flexure suspended and plated on both sides to provide annular metal capacitor pickoff areas 5 and 6.

A compliant flexure 7 is preferably formed by a controlled chemical etch to form a highly compliant bridge. The capacitor areas 5 and 6 and the electrode forcer coil connection areas 8 and 9 are plated on the proof mass by metal vapor disposition. This method of electrode connection across the flexure results in minimal mechanical coupling while providing excellent electrical conductivity. Thus, the effect of extraneous forces transmitted to the proof mass via the electrical connections are minimized.

Forcer coils 10 and 11 attached to the proof mass provide a rebalance force through interaction of the coil current and the magnetic field of the stators. The stators are composed of rings 12 and 13, pole faces 14 and 15, magnets 16 and 17, and stator bodies 18 and 19.

In assembly of the foregoing, and excessive local stress at the interfaces of the proof mass, causing proof mass slippage with failure of the proof mass to restore to its original position, will produce instrument bias and mechanical hysteresis with resulting degradation of instrument operational capabilities. After assembly, the stator bodies 18 and 19 are clamped directly onto the nontapered portion of the ring shaped base member 3 of the proof mass 1. Tie bands 21 and 22 are then cemented into place to fix co-axial alignment of the flexure suspended disk 4 of the proof mass.

As shown in FIG. 3, the tapered portion of the proof mass has no surface in contact with the stator bodies 18 and 19 in the undisturbed state and forms a cantilever with a pivot point 20 where the tapering begins. As a result, a semi-rigid support is provided to the proof mass cantilever flexure 7 and the proof mass 1 is allowed to move with small but controlled movement either about the cantilevered connection defined by compliant flexure section 7 or about the cantilever pivot point 20. Proof mass slippage with failure of the proof mass to restore to its original position is minimized by the use of the tapered design of the proof mass. FIGS. 2 and 3 present the method of mounting the proof mass and illustrates operation thereof. The tapered portion of the proof mass 1 is shown by in taper lines to the left of the line 20 i FIG. 2. FIG. 3 shows that the taper is applied to both sides of the proof mass 1. Therefore, one half of the proof mass is tapered and on both sides. The only mounting surfaces of the proof mass, to the remainder of the instrument, consist of the nontapered portion on both sides of the outer ring 3 of the proof mass 1. The stator bodies 18 and 19 clamp directly onto the nontapered surfaces of the annular section 3. In the quiescent state of no acceleration, the tapered portion of the proof mass to the left of line 20 makes no contact with the remainder of the instrument. Therefore, the tapered portion of the proof mass to the left of line 20 is cantilevered from the line 20. In operation, then line 20 becomes a pivot point for said cantilevered portion. Upon movement of the tapered or cantilevered portion of the proof mass 1, about the cantilevered pivot point 20, the nontapered portion of the annular section 3 remains fixed by the clamping of the mating surfaces of the stator bodies 18 and 19. The metallic plated central disk 4, however, is thus allowed to rotate about the pivot point 20 and inside of the mating surfaces of the stator bodies 18 and 19 and toward forcer coil 10 or 11. This movement of the metallic plated central disk 4 about the pivot point 20 is also by design a movement about the capacitive neutral point of the relative capacitances formed by the metallic plated portions 5 and 6 and the exited stator rings 12 and 13, respectively. Thus is provided a proof mass mounting consisting of the tapered portion of the ring shaped base member 3 including a flexure section 7 mounting base that is cantilevered from a support as established by the now tapered portion of ring shaped base member 3. The proof mass, per se, as defined by the central disk 4, is cantilevered mounted at the flexure section 7 mounting base and extends back toward the support. A double cantilevered proof mass is thus formed. The first cantilever from pivot point 20 is recognized by those skilled in the art as an effective means of minimizing the effects of mechanical hysteresis as seen by the proof mass and resulting from nonrestoring slippage of the mounting interfaces of the stator bodies 18 and 19 and the proof mass disk 1. Movement of the central disk 4 about the flexure section 7 does vary the respective capacitance values and does provide an instrument output signal which is a measure of the acceleration of the instrument. This movement of central disk 4 is, as mentioned earlier, inside of the mounting surface of stator bodies 18 and 19 and toward either forcer coil 10 or 11. Movement about the pivot point also results in movement of the capacitive pairs about the capacitive pickoff neutral axis. These movements about the neutral axis therefore do not change the respective capacitances of capacitance pair defined by the proof mass plated area 5 and stator ring 12 and plated area 6 and the stator ring 13, respectively. Acceleration components perpendicular to the proof mass 1 induce rotation about the compliant flexure 7. These rotations do change the respective capacitances established by the proof mass plated areas 5 and 6 and the stator rings 12 and 13. This change in relative capacitance is the measure of acceleration detected by the instrument.

A method of chemically etching the required convex taper onto the proof mass consists of the following: an indexed wafer with scribed horizontal index lines of predetermined spacing or location is aligned with a clamping fixture with a proof mass cantilever support wafer such that the lower or leading edge of each wafer will contact the surface of an acid etchant solution at the same instant. The acid etchant solution container is mounted upon a platform which can be adjusted vertically. The indexed wafer and the proof mass cantilever support wafer are positioned directly above the acid etchant solution and by observation of a timer, the wafers are immersed in the acid etchant solution at a smooth controlled predetermined rate. This rate is defined by the horizontal scribe lines of the indexed wafer reaching the surface of the acid etchant solution at predetermined intervals of time as referenced to the time of initial contact of the wafers with the surface of the acid etchant solution. Standard optical flat inspection techniques can be utilized to determine the quality of the resultant proof mass cantilever support wafer taper.

The method disclosed above is described to be a manual process utilizing an indexed wafer to control the rate of immersion of the proof mass cantilever support wafer in the acid etchant solution. However, the process described above lends itself to mechanization for large scale production through the use of motor driven precision cam shafts, etc., and it is not intended that the invention should be limited by the description but only by the spirit and scope of the appended claims.

The method of manufacture provides an accelerometer with fewer parts featuring a chemically tapered cantilevered proof mass which eliminates the requirement for shims and provides a positive means of positioning the proof mass so as to decrease instrument bias and errors due to mechanical hysteresis.

In the light of the above teachings of the preferred embodiments disclosed various modifications and variations of the present invention are contemplated and will be apparent to those skilled in the art without departing from the spirit and scope of the invention.

What is claimed is:

1. An accelerometer comprising in combination:
    a ring shaped base member tapered from a central portion of said base member in a first direction;
    a disc shaped proof mass fitting within said ring shaped base member, cantilevered from the tapered end of said base member in an opposite direction and extending beyond said central portion;
    a first and second, flat surfaced stator body clamped on either side of said base member such that said base member is cantilevered from said stator bodies at said central portion to provide for movement of said base member in the area provided by said taper; and
    pickoff means having a first part on said proof mass and a second part mounted on said stator bodies.

2. The accelerometer according to claim 1 wherein said proof mass is centrally disposed within said base member.

3. The accelerometer according to claim 1 wherein said proof mass including said base member is tapered to form convex upper and lower surfaces over approximately one half of the proof mass.

4. The accelerometer according to claim 1 wherein said base member is annularly disposed about said proof mass and only a sector of the base member is tapered to provide cantilever over the tapered sector of said base member.

* * * * *